United States Patent Office 3,235,571
Patented Feb. 15, 1966

3,235,571
DICYANO METHYLENE STEROIDS OF THE ANDROSTANE AND PREGNANE SERIES
Richard E. Benson, Wilmington, Del., assignor to E. I. du Pont de Nemours and Company, Wilmington, Del., a corporation of Delaware
No Drawing. Filed July 2, 1964, Ser. No. 380,031
8 Claims. (Cl. 260—397)

This invention relates to new steroids and to a method of preparing these compounds. More specifically, the new products of this invention are certain steroids of the androstane, estrane and pregnane series and the corresponding unsaturated derivatives thereof in which the carbon atom in the 3-position bears a dicyanomethylene group, $(NC)_2C=$, as the substituent.

This application is a continuation-in-part of co-pending application Serial No. 317,142, filed on October 18, 1963, now abandoned.

These compounds are prepared by condensing malononitrile with a 3-keto steroid (more precisely defined below) of the androstane, estrane or pregnane series or an unsaturated derivative thereof in the presence of a catalyst comprising a basic material, i.e., a base or basic salt (the salt of a strong base and a weak acid) in accordance with the equation

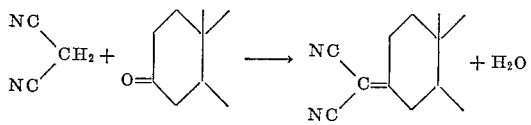

where only the A ring of the steroidal structure is shown. The preferred, novel steroids prepared by the process are 3-dicyanomethylene androstanes, estranes, pregnanes, androstenes, estrenes, and pregnenes.

In this process the steroidal reactant is a 3-keto steroid having the basic androstane, estrane (often also called 19-norandrostane) or pregnane structure, as defined in the Rules on Nomenclature of the International Union of Pure and Applied Chemistry, or an unsaturated derivative thereof. More specifically, the starting materials are the 3-keto steroids in which the 17-carbon atom is bound by its two exocyclic valences to (a) a radical $R^1$, which is H, OH or O-Acyl; and (b) a radical $R^2$, which is H, $CH_3$, $C_2H_5$, $C\equiv CH$, $COCH_3$, $COCH_2OH$, $COCH_2O$-Acyl, $CH(CH_3)OH$, or $CH(CH_3)O$-Acyl, and $R^1$ and $R^2$ together can be the oxo group, $=O$. The term "Acyl" designates a hydrocarbon carboxylic acyl radical having from one to ten carbon atoms. Representative of such acyl radicals are the lower alkanoyl radicals, e.g., formyl, acetyl, propionyl, isobutyryl, hexanoyl, octanoyl, decanoyl, and the like; cycloalkyl-lower-alkanoyl radicals, e.g., cyclopentylacetyl, β-cyclohexylpropionyl, and the like; aroyl and alkaroyl radicals, e.g., benzoyl, p-toluyl, and the like; and aralkanoyl radicals, e.g., phenylacetyl, β-phenylpropionyl, and the like.

When the steroid nucleus in the starting material bears an oxo substituent at the 17-position, this oxo group may be partly or wholly converted to a dicyanomethylene group, although it may be protected, for example by ketalization, if selective conversion is desired. The steroid starting material may also contain intracyclic unsaturation. In particular, the 3-keto androstenes, estrenes (19-norandrostenes), and pregnenes having unsaturation at the 1, 4 and/or 5 carbons are suitable starting materials.

While the relative proportions of the two reactants are not critical since the reaction will proceed regardless of what they are, the malononitrile is advantageously used in at least equimolar amounts relative to the steroid reactant, in order to insure more complete utilization of the latter. In general, it is preferred to use an excess of malononitrile, which may be substantial, e.g., 5–15 moles per mole of the 3-keto steroid. However, if a 17-oxo group is present and preferential reaction of the more reactive 3-keto group is desired, the stoichiometric amount of malononitrile, or even less, may be employed.

The condensation is carried out in the presence of a catalyst. These are basic materials, i.e., bases or salts of bases and weak acids, i.e., basic salts which are capable of ionizing in water to give a basic solution. Thus, there can be used inorganic bases such as sodium hydroxide, potassium hydroxide or ammonium hydroxide, or their weak acid salts such as sodium acetate, potassium benzoate, ammonium acetate, potassium cyanide or sodium bisulfite; amines such as diethylamine, trimethylamine, pyridine, piperidine, cyclohexylamine, p-aminophenol, N-methylaniline, o-toluidine, or their salts such as the acetates or propionates; or aminoacids such as ε-aminocaproic acid, α-aminophenylacetic acid, β-alanine, m-aminobenzoic acid, L-leucine, glycine, dl-lysine, dl-methionine, etc. These products can be used in catalytic amounts, e.g., of the order of 0.005 mole, or even less, per mole of malononitrile, but very much larger quantities can be used, if desired. For example, it is often advantageous to use massive amounts of a liquid nitrogen base, such as pyridine, in which case it serves also as a solvent for the reaction.

The reaction proceeds at room temperature, i.e., at temperatures in the range of 15–25° C. Its rate can be increased by the use of higher temperatures, such as 75–125° C., but it is in general unnecessary to exceed about 150° C.

When the reaction is carried out at temperatures exceeding the melting point of malononitrile (about 32° C.), a solvent is not necessary, especially when the malononitrile is used in substantial excess. At lower temperatures, or with little no excess of malononitrile, the reaction is conveniently carried out in a substantially inert organic liquid which dissolves the reactants to at least some extent. As already mentioned, a liquid nitrogen base such as pyridine or piperidine which also serves as the catalyst can be used for this purpose. In fact, this mode of operation generally gives the best results and is preferred, especially with α,β-unsaturated 3-keto steroids. Other suitable solvents include hydrocarbons such as heptane, petroleum ether, cyclohexane, benzene or toluene; halohydrocarbons such as carbon tetrachloride, chloroform, 1,2-dichloroethane, 1,1,2-trichloro-1,2,2-trifluoroethane or chlorobenzene; ethers such as di-n-butyl ether, ethylene glycol dimethyl ether, dioxane or tetrahydrofuran; nitriles such as acetonitrile or benzonitrile; and the like. The solvent need not be rigorously anhydrous. Nevertheless, the presence of substantial amounts of water (appreciably exceeding that formed during the condensation) is to be avoided. The water formed need not be removed from the reaction mixture but, if desired, this can be done by means of dehydrating agents, by simple distillation, or by refluxing the reaction mixture in the presence of an inert organic liquid immiscible with water, such as a hydrocarbon, and separating the water formed from the reflux condensate.

The 3-dicyanomethylene steroid obtained in this reaction can be isolated in any convenient manner, for example, by dissolving any unreacted malononitrile in water, with or without prior removal of any solvent present. It can be purified by crystallization from an appropriate solvent or by chromatographic methods.

The invention is illustrated in greater detail by the following examples:

EXAMPLE 1

*3-dicyanomethylene-5α-androstane-17β-ol*

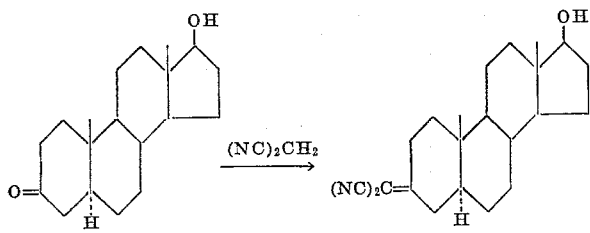

An intimate mixture of 3-keto-5α-androstane-17β-ol (7.0 g.), malononitrile (10 g.) and β-alanine (0.10 g.) was heated at 120° C. for 15 minutes, at the end of which the liquid mixture solidified. The solid was cooled to room temperature, ground into small pieces and stirred with 100 ml. of water for 15 minutes, after which the water was decanted and the solid again worked up with water for 0.5 hour. The remaining insoluble solid was collected by filtration and washed with two 100-ml. portions of methanol. Crystallization from a mixture of benzene (350 ml.) and hexane (100 ml.) gave 5.8 g. of 3-dicyanomethylene-5α-androstane-17β-ol as crystals melting at 250.5–251.5° C., $[\alpha]_D^{22}$ +12° (dioxane, c. 3.78).

*Analysis.*—Calc'd for $C_{22}H_{30}N_2O$: C, 78.06; H, 8.93; N, 8.28. Found: C, 78.23; H, 9.06; N, 8.23.

Ultraviolet: $\lambda_{max.}^{EtOH}$ 245 mμ ($\epsilon$=15,400).

Infrared: $\lambda_{max.}^{Nujol}$ 2.81μ (OH), 4.48μ (C≡N), 6.25μ (C=C)

EXAMPLE 2

*3-dicyanomethylene-5α-pregnane-20-one*

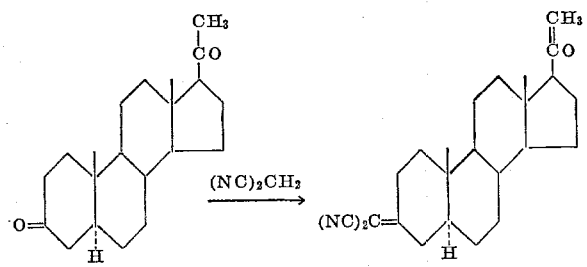

An intimate mixture of 5α-pregnane-3,20-dione (5.1 g.), malononitrile (14 g.) and β-alanine (0.1 g.) was heated at 123–125° C. for 10 minutes and at 100° C. for 30 minutes. The mixture, which solidified on cooling to room temperature, was ground to a powder and washed with several portions of water. Crystallization from a benzene-hexane mixture gave 5.2 g. of white needles, M.P. 151–155° C., and recrystallization from pure benzene gave about 3 g. of 3-dicyanomethylene-5α-pregnane-20-one as crystals melting at 156.5–157° C. $[\alpha]_D^{22}$ +86° (dioxane, c. 2.40).

*Analysis.*—Calc'd for $C_{24}H_{32}N_2O$: C, 79.08; H, 8.85; N, 7.69. Found: C, 79.23; H, 8.74; N, 7.72.

Ultraviolet: $\lambda_{max.}^{EtOH}$ 244 mμ ($\epsilon$=15,700).

Infrared: $\lambda_{max.}^{Nujol}$ 4.28μ (C≡N), 5.85μ (C=O), 6.22μ (C=C).

EXAMPLE 3

*3-dicyanomethylene-4-androstene-17β-ol*

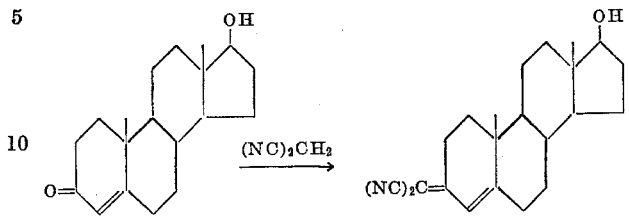

A solution of 4-androstene-17β-ol-3-one (testosterone, 5.0 g.) and malononitrile (5.0 g.) in 25 ml. of pyridine that had been dried over potassium hydroxide pellets was stirred at room temperature for 16 hours. The dark mixture that resulted was poured into 500 ml. of water containing 30 ml. of concentrated hydrochloric acid and the aqueous mixture was extracted with diethyl ether several times. The combined ether extracts were washed with 5% aqueous hydrochloric acid and dried over anhydrous magnesium sulfate and the solvent was evaporated, leaving a brown amorphous solid (6.88 g.). This was dissolved in benzene and the solution was chromatographed with benzene on neutral alumina (250 g., activity IV). There was obtained 3.1 g. of 3-dicyanomethylene-4-androstene-17β-ol as needles melting at 177.2–177.8° C., $[\alpha]_D^{22}$ +289° (chloroform, c. 2.56).

*Analysis.*—Calc'd for $C_{22}H_{28}N_2O$: C, 78.53; H, 8.39; N, 8.33. Found: C, 78.28; H, 8.47; N, 8.31.

Ultraviolet: $\lambda_{max.}^{EtOH}$ 309 mμ ($\epsilon$=28,000)

Infrared: $\lambda_{max.}^{Nujol}$ 2.78μ (OH), 4.50μ (C≡N), 6.28μ (C=C), 6.48μ ($\Delta^4$ C=C).

EXAMPLE 4

*3-dicyanomethylene-1,4-androstadiene-17-one*

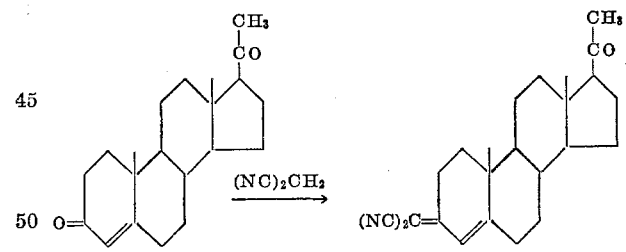

A solution of 4-pregnene-3,20-dione (progesterone, 6.0 g.) and malononitrile (6.0 g.) in 25 ml. of dry pyridine was stirred at room temperature for 23 hours. The reaction product was isolated as in Example 3. The resulting amorphous brown solid was dissolved in benzene and the solution was chromatographed with benzene-petroleum ether mixtures on neutral alumina (230 g., activity III). This gave a mixture of colorless products melting over the range 165–185° C. Repeated chromatography of this material over alumina showed that some decomposition, presumably hydrolytic, took place on the column, for the absorbent became colored dark purple. Nevertheless, it was possible to isolate a crystalline product, M.P. 163.5–164° C., whose infrared spectrum and elemental analyses showed that it was 3-dicyanomethylene-4-pregnene-20-one.

*Analysis.*—Calc'd for $C_{24}H_{30}N_2O$: C, 79.51; H, 8.34; N, 7.73. Found: C, 79.53; H, 8.37; N, 7.80.

Ultraviolet: $\lambda_{max.}^{EtOH}$ 308 mμ ($\epsilon$=29,000)

Infrared: $\lambda_{max.}^{CHCl_3}$ 4.51μ (C≡N), 5.90μ (C—20. C=O), 6.23μ (C=C), 6.47μ ($\Delta^4$ C=C).

EXAMPLE 5

*3-dicyanomethylene-1,4-androstadiene-17-one*

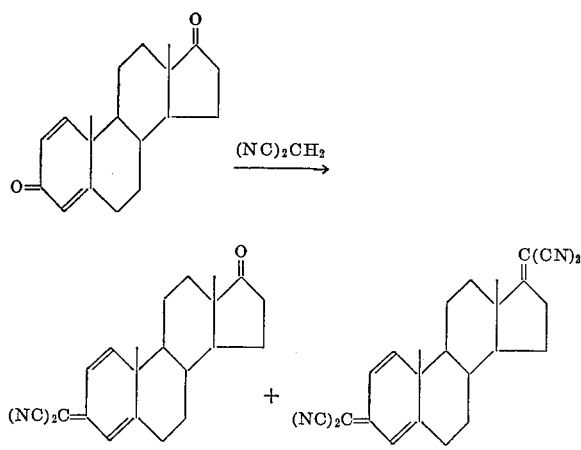

In this example the major reaction product was 3-dicyanomethylene-1,4-androstadiene-17-one, but 3,17-bis-(dicyanomethylene)-1,4-androstadiene also formed in appreciable amounts.

A solution of 1,4-androstadiene-3-one (4.0 g.) and malononitrile (6.0 g.) in 20 ml. of dry pyridine was stirred at room temperature for 2 days. The dark reaction mixture was poured into 350 ml. of water containing 30 ml. of concentrated hydrochloric acid and the aqueous mixture was extracted with three 125-ml. portions of diethyl ether and then with 100 ml. of methylene chloride. The combined extracts were washed with 5% aqueous hydrochloric acid and dried over magnesium sulfate. Evaporation of the solvents gave 6.06 g. of an amorphous brown solid. This was dissolved in benzene and the solution was chromatographed rapidly (3 hours) on neutral alumina (120 g., activity III). This afforded two crystalline solids: A, M.P. 206–207° C. (2.48 g.), and B, M.P. 185–215° C. 0.95 g.).

Crystallization of (A) from a benzene-cyclohexane mixture gave 1.5 g. of a light yellow crystalline solid whose infrared spectrum showed it to be 3-dicyanomethylene-4-androstadiene-17-one.

*Analysis.*—Calc'd for $C_{22}H_{24}N_2O$: C, 79.48; H, 7.28; N, 8.43. Found: C, 79.40; H, 7.42; N, 8.78.

Infrared: $\lambda_{max.}^{CHCl_3}$ 4.5μ, 5.78μ, 6.06μ, 6.33μ, 6.55μ.

Ultraviolet: $\lambda_{max.}^{EtOH}$ 333 mμ (ε=28,000).

Crystallization of compound (B) from ethanol gave 0.35 g. of colorless needles, M.P. 251.5–254° C., whose infrared spectrum supported the 3,17-bis(dicyanomethylene)-1,4-androstadiene structure.

*Analysis.*—Calc'd for $C_{25}H_{24}N_4$: C, 78.92; H, 6.36; N, 14.73. Found: C, 78.91; H, 6.56; N, 14.43.

Infrared: $\lambda_{max.}^{CHCl_3}$ 4.5μ, 6.06μ, 6.25μ, 6.33μ, 6.55μ.

Ultraviolet: $\lambda_{max.}^{EtOH}$ 333 mμ (ε=30,000); 237 mμ (ε= 15,000).

EXAMPLE 6

*3-dicyanomethylene-4-estrene-17β-ol*

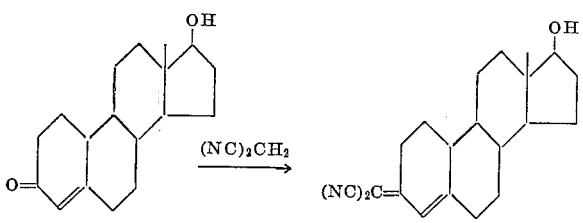

A solution of 4-estrene-17β-ol-3-one (5.0 g.) and malononitrile (5.0 g.) in 25 ml. of dry pyridine was stirred at room temperature for 2 days. The reaction mixture was poured into a solution of 35 ml. of concentrated hydrochloric acid in 300 ml. of water and the aqueous mixture was extracted with diethyl ether several times. The combined ether extracts were then washed with 5% aqueous hydrochloric acid and dried. Evaporation of the ether under reduced pressure gave about 6 g. of a brown gum which was dissolved in benzene. The solution was absorbed on a column of acid alumina (200 g., activity III). Elution with petroleum ether and benzene gave, in the benzene eluate, 3 - dicyanomethylene - 4 - estrene-17β-ol which, after crystallization from benzene-cyclohexane, weighed 4.32 g. An analytical sample recrystallized from the same solvent pair melted at 136–139° C.

*Analysis.*—Calc'd for $C_{21}H_{26}N_2O$: C, 78.22; H, 8.13; N, 8.69. Found: C, 78.39; H, 8.26; N, 8.95.

The infrared spectrum supported the assigned structure.

The foregoing examples are to be considered as illustrative rather than limitative, since the described process is broadly applicable to the preparation of any 3-dicyanomethyleneandrostane, -estrane or -pregnane, optionally containing intracyclic unsaturation, as defined above, from the corresponding 3-ketoandrostane, -estrane or -pregnane.

As already indicated in the discussion of the starting materials, the products of this invention are those represented by the formula

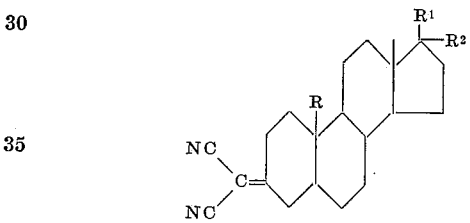

which as previously discussed includes the intracyclically unsaturated compounds of the same structure, in particular the $\Delta^1$, $\Delta^4$, and/or $\Delta^5$ compounds. In this formula, R is $CH_3$ in the case of androstanes and pregnanes or H in the case of estranes, i.e., 19-norandrostanes; $R^1$ is H, OH or O-Acyl, Acyl being a hydrocarbon carboxylic acyl radical of 1–10 carbons, preferably alkanoyl; $R^2$ is H, $CH_3$, $C_2H_5$, $C\equiv CH$, $COCH_3$, $COCH_2OH$, $COCH_2O$-Acyl, $$CH(CH_3)OH$$

or $CH(CH_3)O$-Acyl or, together with $R^1$, =O or $$=C(CN)_2$$

Alternatively, the structural formula may be written as

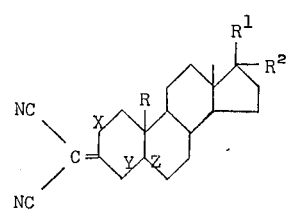

wherein R, $R^1$ and $R^2$ are defined as above and the symbols X, Y and Z represent either double or single bonds; however, only one of the Y and Z bonds can be a double bond.

Other specific examples of 3-dicyanomethyleneandrostanes, -estranes and -pregnanes and their corresponding unsaturated derivatives which can be prepared by the described procedure include those listed below opposite the formulas of the steroid reactant. It will be understood that still other 3-dicyanomethylene steroids can be obtained from either the starting materials or the reaction products shown by additional, conventional reactions well known to steroid chemists such as esterification, reduction, oxidation, dehydrogenation, C-17 alkylation or ethynylation, and the like.

| Steroid reactant | Reaction product |
|---|---|
| 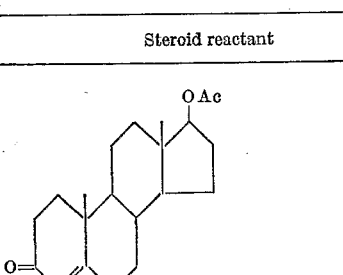 | 17β-acetoxy-3-dicyanomethylene-4-androstene. |
| 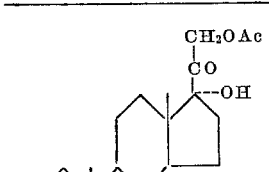 | 3-dicyanomethylene-17β-propionoxyestrane |
| 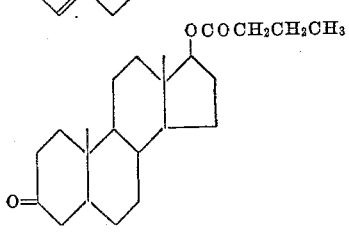 | 3-dicyanomethylene-17α-methyl-4-androstene-17β-ol |
| 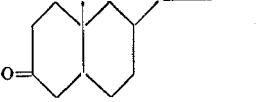 | 3-dicyanomethylene-17α-ethynyl-4-androstene-17β-ol |
| 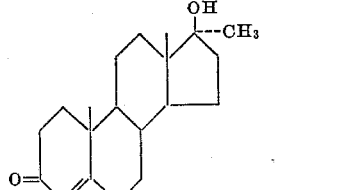 | 3-dicyanomethylenepregnane-17α-ol |
| 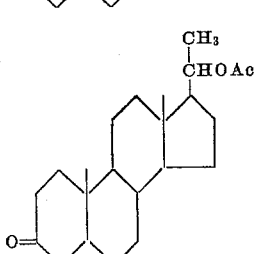 | 17α,20-diacetoxy-3-dicyanomethylene-5-pregnene |
| 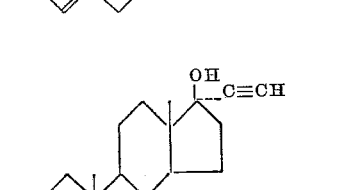 | 17α-acetoxy-3-dicyanomethylenepregnane-20-one |
| 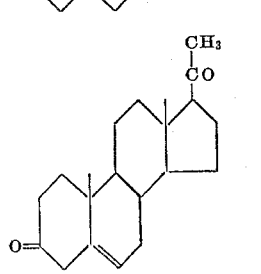 | 21-acetoxy-3-dicyanomethylene-17α-hydroxy-pregnane-20-one |
| 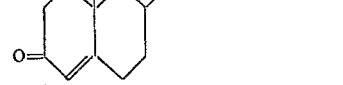 | 20-acetoxy-3-dicyanomethylene-pregnane. |
|  | 3-dicyanomethylene-5-pregnene-20-one. |
| 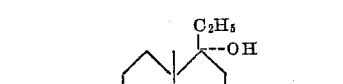 | 3-dicyanomethylene-pregnane-20-ol. |
|  | 3-dicyanomethylene-17α,21-dihydroxy-4-pregnene-20-one. |
| 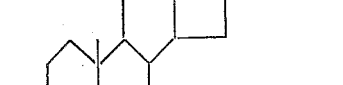 | 3-dicyanomethyleneestrane-17-one. |
| 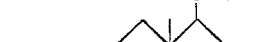 | 17β-benzoxy-3-dicyanomethylene-1,4-estradiene. |

| Steroid reactant | Reaction product |
|---|---|
| (OH, C≡CH steroid structure) | 3-dicyanomethylene-17α-ethynyl-4-estrene-17β-ol. |
| (CH₂OCO(CH₂)₉CH₃, CO steroid structure) | 21-decanoyloxy-3-dicyanomethylene-4-pregnene-20-one. |
| (CH₃, CO, OH pregnadiene structure) | 3-dicyanomethylene-17α-hydroxy-1,4-pregnadiene-20-one. |
| (OCOCH₂C₆H₅, C≡CH androstane structure) | 3-dicyanomethylene-17-α-ethynyl-17α-phenylacetoxy-androstane. |
| (CH₂OAc, CO, OAc pregnene structure) | 17α,21-diacetoxy-3-dicyanomethylene-1-pregnene-20-one. |
| (C(CN)₂ estrene structure) | 3,17-bis(dicyanomethylene)-4-estrene. |

The 3-dicyonamethylene steroids of this invention are physiologically active, as shown by tests on male and female rats and female rabbits. This activity occurs in both the intracyclically saturated and unsaturated steroids. The activity is, for the androstane and androstene derivatives of the invention, in certain respects similar to and in other respects different from that of the corresponding steroid C-3 ketones. For example, in intact male rats at doses at which 5α-androstane-17β-ol-3-one shows strong anabolic and androgenic activity and shows suppression of gonadotrophin, its dicyanomethylene derivative, 3-dicyanomethylene-5α-androstane-17β-ol, shows little or no anabolic or androgenic activity, but, at the same time, shows definite anti-gonadotrophic activity. This type of activity is valuable in uses where anti-gonadotropric action is desired without other hormonal effects.

The 3-dicyanomethylene pregnanes and pregnenes also exhibit an unexpected separation of physiological effects which is desirable in some applications. Their activities are in certain respects similar to and in other respects different from those of the corresponding steroid C-3 ketones. For example, in female rabbits at doses at which progesterone shows progestational activity, 3-dicyanomethylene-4-pregnene-20-one shows little or no progestational activity. Yet the dicyanomethylene derivative will, like progesterone, inhibit ovulation in rabbits.

3-dicyanomethylene estranes and estrenes are also physiologically active but in a different way from the corresponding steroid C-3 ketones. Thus, at doses at which 19-nor-testosterone shows strong myotrophic and androgenic activity in castrate male rats, 3-dicyanomethylene-4-estrene-17β-ol shows no myotrophic or androgenic activity. In fact, intact male rats receiving larger doses of this compound undergo atrophy of the ventral prostrate glands. This kind of effect shows usefulness of these compounds in the chemical treatment of prostatic hypertrophy.

As shown by these representative test results, many of the 3-dicyanomethylene steroids of the invention find utility in the same areas of application as the corresponding 3-keto steroids, with the advantage that some of their useful properties are stronger relative to other, sometimes less useful or even undesirable, properties of the known steroids. Other compounds of the invention have special and useful activities not possessed by the known related 3-keto steroids.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A steroid of the structural formula

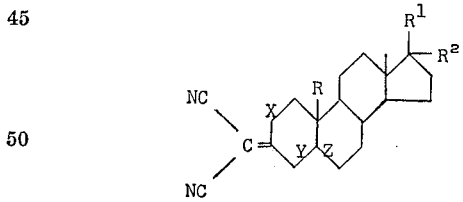

wherein R is selected from the group consisting of —CH₃ and —H; R¹ is of the group consisting of —H, —OH, and O-Acyl; R² is selected from the group consisting of —H, —CH₃, —C₂H₅, —C≡CH, —COCH₃, —COCH₂OH, —COCH₂O-Acyl, —CH(CH₃)OH, and —CH(CH₃)O-Acyl; Acyl is a hydrocarbon carboxylic acyl radical of 1–10 carbon atoms; and R¹ and R² together are selected from the group consisting of =O and =C(CN)₂; and X, Y and Z represent a bond selected from the class consisting of a single bond and a double bond, with the proviso that when X is a double bond, Z is a single bond.

2. 3-dicyanomethylene-5α-androstane-17β-ol.
3. 3-dicyanomethylene-5α-pregnane-20-one.
4. 3-dicyanomethylene-4-androstene-17β-ol.
5. 3-dicyanomethylene-4-pregnene-20-one.
6. 3-dicyanomethylene-1,4-androstadiene-17-one.
7. 3-dicyanomethylene-4-estrene-17β-ol.
8. 3,17-bis(dicyanomethylene)-1,4-androstadiene.

No references cited.

LEWIS GOTTS, *Primary Examiner.*